United States Patent [19]

Bradley et al.

[11] 4,332,511
[45] Jun. 1, 1982

[54] CABLE BURYING APPARATUS

[76] Inventors: Dennis K. Bradley, 3900 E. 15th St., Casper, Wyo. 82601; Harold R. Brewbaker, 6117 Becker La., Loveland, Colo. 80537; Vern W. West, 3810 N. Taft Hill Rd., Fort Collins, Colo. 80524

[21] Appl. No.: 138,596

[22] Filed: Apr. 9, 1980

[51] Int. Cl.³ .............................................. F16L 1/02
[52] U.S. Cl. ....................................... 405/178; 405/179
[58] Field of Search ................. 405/154, 174, 178, 179

[56] References Cited

U.S. PATENT DOCUMENTS

| 882,649 | 3/1908 | Noble | 405/178 X |
|---|---|---|---|
| 3,605,419 | 9/1971 | Wells | 405/179 |
| 3,849,998 | 11/1974 | Thacker | 405/179 |
| 3,931,717 | 1/1976 | Schuck | 405/178 |
| 4,028,902 | 6/1977 | Courson et al. | 405/179 X |

*Primary Examiner*—David H. Corbin
*Attorney, Agent, or Firm*—William E. Hein

[57] ABSTRACT

An apparatus for simultaneously burying a plurality of cables in a previously excavated trench in a spaced relationship to each other and for protectively surrounding those spaced apart cables with sand comprises a cable supply vehicle from which the plurality of cables is unreeled, a cable guide boom assembly for spatially aligning the cables, a sanding sled that is positioned within the trench for guiding the cables into the desired spatial relationship and for distributing sand to a desired depth around the plurality of cables, a sand supply vehicle for providing a source of sand at a controlled rate of flow to the sanding sled, and a tractor vehicle for pulling both the sand supply vehicle and the sanding sled along the path of the trench.

4 Claims, 9 Drawing Figures

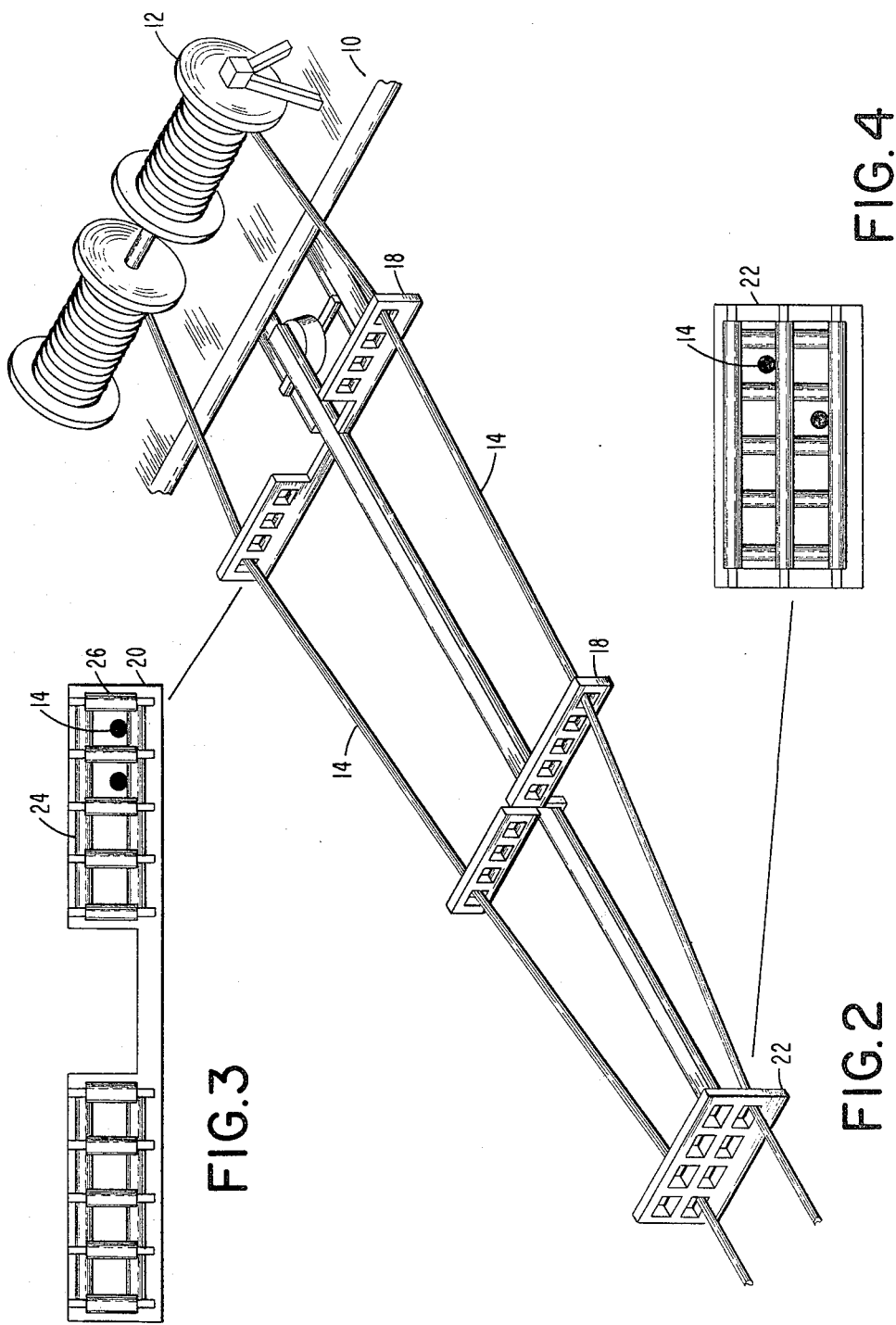

CABLE BURYING APPARATUS

BACKGROUND AND SUMMARY OF THE INVENTION

This invention relates generally to the burying of utility cables and more specifically to an apparatus for simultaneously burying a plurality of such cables in a previously excavated trench in a spaced relationship to each other and for protectively surrounding those spaced apart, buried cables with sand.

During the past decade, emphasis has been placed on the underground rather than above ground location of utility lines associated with new commercial and residential subdivisions. Environmental and aesthetic considerations, as well as reduced line maintenance costs, have made underground emplacement of those lines a desirable alternative to their historical location on poles. Generally, it is desired to place a number of cables, including electrical, telephone, and television cables, in a common excavated trench approximately four feet in depth. The proper placement and protection of such cables has been of continuing concern to the power utility companies due to the extremely high cost of replacing or repairing cables that have been damaged during emplacement. As a result, these companies have been unwilling to entrust this operation to subcontractors, preferring instead to utilize their own crews. Telephone and cable television companies have followed similar practices, which, in the aggregate, have resulted in far less than optimum protection for the cables to be buried. Because of the involvement of several utility companies in attempting to place different types of cables in a common trench, the logistics of coordinating the efforts of several crews makes simultaneous emplacement of all the necessary cables nearly an impossibility. Thus, a trench may often remain open for several weeks to accommodate the cable emplacement schedules of the various utility companies involved. During this time period, the walls of the trench often collapse, debris is permitted to fall into the trench, and damage regularly occurs to previously placed cables during subsequent emplacement operations.

Since the various cables are typically placed in the trench manually by the different utility company crews, a good deal of undesirable variation results in cable placement and cable separation. This problem is compounded by the wide range of cable types and sizes that may be placed in a given trench. In addition, backfill operations are generally conducted in an uncontrolled manner that permits cable damage due to the presence of rocks, debris, and other undesirable material that inadvertently falls directly on top of or adjacent to some of the cables. This problem is particularly significant in the case where dirt removed from the trench is used as the backfill material. In an attempt to minimize damage to the emplaced cables, some companies have adopted the practice of using sand as the initial backfill material. However, due to a lack of effective control in disbursing the sand, more sand than is necessary is used, further increasing costs. Moreover, the inefficient sand disbursement processes employed introduces further delays in the cable emplacement operations.

In order to minimize damage to buried cables, the various utility companies often employ very skilled and conscientious personnel who could be more efficiently utilized in other positions. Because of the lack of control inherent in the manual methods of cable emplacement that have been widely practiced over the past several years, minor damage or lack of protection to emplaced cables has often gone undetected. As a result, utility companies are now experiencing an increase in the frequency of maintenance and repair operations performed on existing underground lines. A frequent cause of failure has been previously undetected cable damage occuring at the time of emplacement.

Accordingly, it is the principal object of this invention to provide an apparatus for controllably placing a plurality of cables in a single trench so as to maintain a predetermined spatial relationship between the cables.

A further object of this invention is to provide an apparatus for controllably introducing sand backfill material at the time of emplacement of a plurality of underground cables.

An additional object of this invention is to provide a cable burying apparatus having means for guiding a plurality of cables from their individual supply reels into a previously excavated trench in a manner that affords maximum protection against damage to the cables.

Additional and incidental objects of the present invention will become apparent from the attached specification and drawings.

These objects are accomplished in accordance with the illustrated preferred embodiment of the invention by providing a sanding sled that is positioned for being pulled by a tractor or other vehicle along a previously excavated trench. The sanding sled receives a plurality of cables to be buried from a reel supply vehicle that precedes the sanding sled-tractor combination. A cable guide boom assembly collects the individual cables as they are unspooled from supply reels and spatially positions them for later placement in the trench. The cables are guided through the sanding sled so as to exit the sanding sled in a predetermined spatial relationship to each other. A sand supply vehicle that moves in concert with the sanding sled controllably releases sand into a chamber portion of the sanding sled that serves to funnel the sand into the areas between the individual cables so that the desired spatial relationship between the cables is maintained.

DESCRIPTION OF THE DRAWINGS

FIG. 2 is a diagram illustrating the way in which a typical cable pair is unspooled from a pair of reels on a cable supply vehicle of FIG. 1 and the manner in which a cable guide boom assembly spatially positions the cables.

FIG. 3 is a detailed diagram of a typical one of the cable guide bars comprising the cable guide boom assembly illustrated in FIGS. 1 and 2.

FIG. 4 is a detailed diagram of the guide roller assembly located at the rear of the cable guide boom assembly illustrated in FIGS. 1 and 2.

DESCRIPTION OF THE PREFERRED EMBODIMENT

Figure 1:
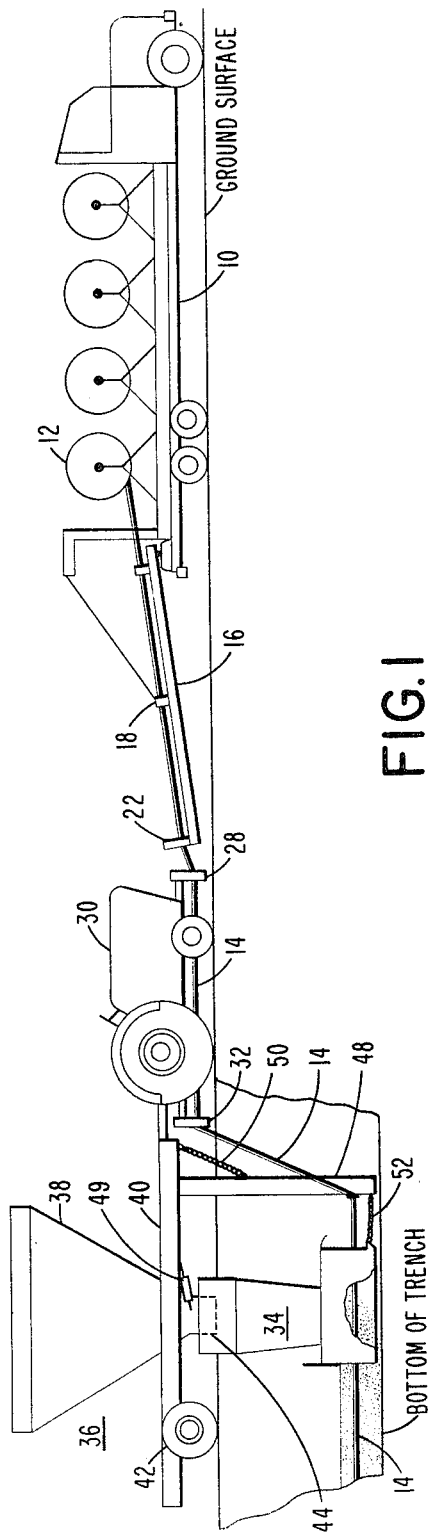
FIG. 1 is a pictorial diagram of a cable burying apparatus constructed in accordance with the present invention.

Referring now to FIG. 1, there is shown a cable supply vehicle 10 that may be either self-propelled or pulled by a powered vehicle. Cable supply vehicle 10 is constructed to carry a number of cable reels 12 that are supported for unreeling cable 14 therefrom. A cable guide boom assembly 16, illustrated in detail in FIG. 2, is connected to the rear of cable supply vehicle 10 to guide the cables 14 as they are unreeled during operation of the cable burying apparatus. Cable guide boom assembly 16 includes as many guide bars 18 as may be required to adequately support cables 14. Each guide bar 18 preferably includes left and right guide roller assemblies 20, as shown in detail in FIG. 3. The left guide roller assembly of each guide bar 18 serves to guide the cables 14 received from cable reels 12 that are generally positioned on the left side of the cable supply vehicle 10, while the right guide roller assembly of each guide bar 18 serves to guide the cables 14 received from cable reels 12 that are generally positioned on the right side of cable supply vehicle 10. The left and right guide roller assemblies 20 of the guide bars 18 are positioned progressively closer together on those guide bars nearer the rear of boom assembly 16 to guide the cables 14 into a relatively compact bundle at the rear of boom assembly 16. A single guide roller assembly 22, as shown in detail in FIG. 4, is located at the rear of boom assembly 16. Guide roller assemblies 20 and 22 may include, for example, a pair of horizontally positioned rollers 24 and a plurality of vertical rollers 26 positioned adjacent thereto to define a number of cable guideways through which cables 14 pass. Alternatively, vertical rollers 26 may be replaced by fixed vertical bars. The cable guide boom assembly 16 is connected to the rear of cable supply vehicle 10 such that cable guide boom assembly 16 is permitted to swing to either side of the cable supply vehicle.

As cables 14 exit guide roller assembly 22 at the rear of cable guide boom assembly 16, they are routed through another guide roller assembly 28, attached to the front of a tractor 30, and beneath tractor 30 to another guide roller assembly 32 mounted at the rear of tractor 30. Guide roller assemblies 28 and 32 are constructed like guide roller assembly 22 illustrated in FIG. 4.

Figure 7:
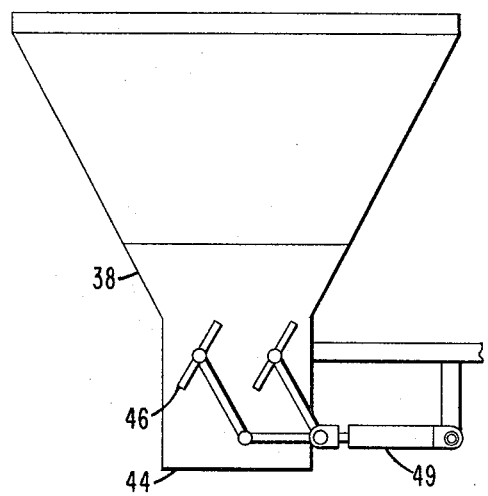
FIG. 7 is a diagram illustrating the vane shutoff in the outlet of the sand bin located on the sand supply vehicle of FIG. 1.

Also as illustrated in FIG. 1, a sanding sled 34 is positioned within a previously excavated trench into which it is desired to place cables 14. A sand supply vehicle 36, mounted on a pair of wheels 42, is adapted to be pulled by tractor 30. Sand supply vehicle 36 includes a sand bin 38 mounted on a frame 40. Wheels 42 are sufficiently spaced apart so that they straddle the trench as the sand supply vehicle is pulled forward by tractor 30. Sand bin 38 is arranged on frame 40 of sand supply vehicle 36 so that an outlet 44 thereof is positioned over the trench to supply sand to sanding sled 34. As shown in FIG. 7, sand bin 38 includes a conventional vane shutoff 46 that is operated by a hydraulic cylinder 49 for controlling the flow of sand from sand bin 38. A drag arm 48 is coupled to frame 40 near the front of sand supply vehicle 36 and extends vertically into the trench. A chain or other convenient bracing member 50 is connected between a drag arm 48 and a point on frame 40 near tractor 30 for purposes of bracing drag arm 48 when the cable burying apparatus is in operation. Sanding sled 34 is coupled to drag arm 48 by means of a chain 52.

Figure 8:
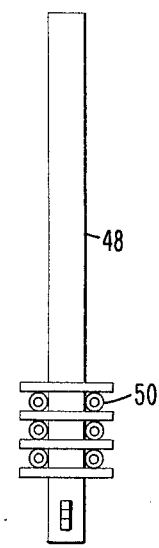
FIG. 8 is a diagram of the drag arm located on the sand supply vehicle of FIG. 1 illustrating the ferrules employed to guide a plurality of cables into position for being received by the sanding sled of FIG. 1.

As shown in FIG. 8, drag arm 48 includes a number of ferrules 50 for guiding cables 14 as they are received from the cable guide roller assembly 32 mounted at the rear of tractor 30.

Figure 9:
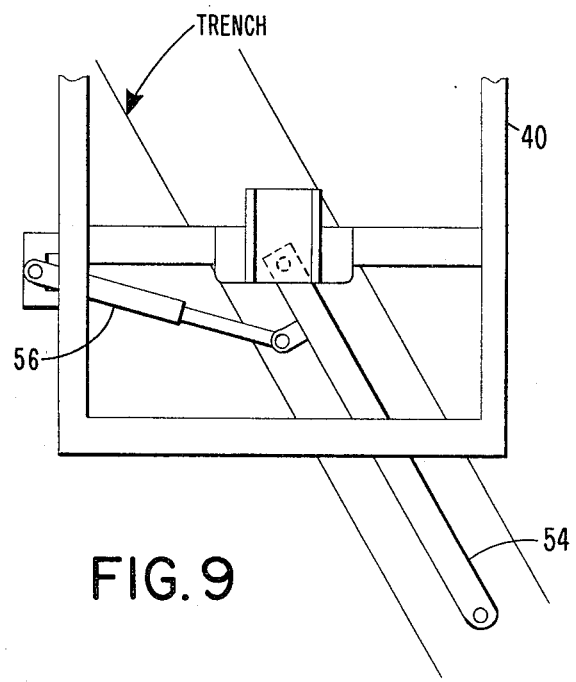
FIG. 9 is a plan view diagram of the hitch assembly of the sand supply vehicle of FIG. 1 illustrating the way in which the hitch is hydraulically controlled to steer the sand supply vehicle over a trench to maintain the sand supply vehicle in position over the trench as direction changes in the trench are negotiated.

As shown in FIG. 9, frame 40 of sand supply vehicle 36 includes a moveable hitch 54 for connecting the sand supply vehicle to tractor 30. The position of hitch 54 is controlled in a conventional way by means of a hydraulic cylinder 56 to steer the sand supply vehicle into position directly over the trench. This feature is particularly useful when burying cables in a trench that includes curved sections. As tractor 30 follows a curved trench, the hydraulic cylinder 56 is employed to offset the hitch 54 to maintain the sand supply vehicle in position directly over the trench.

Figure 5:
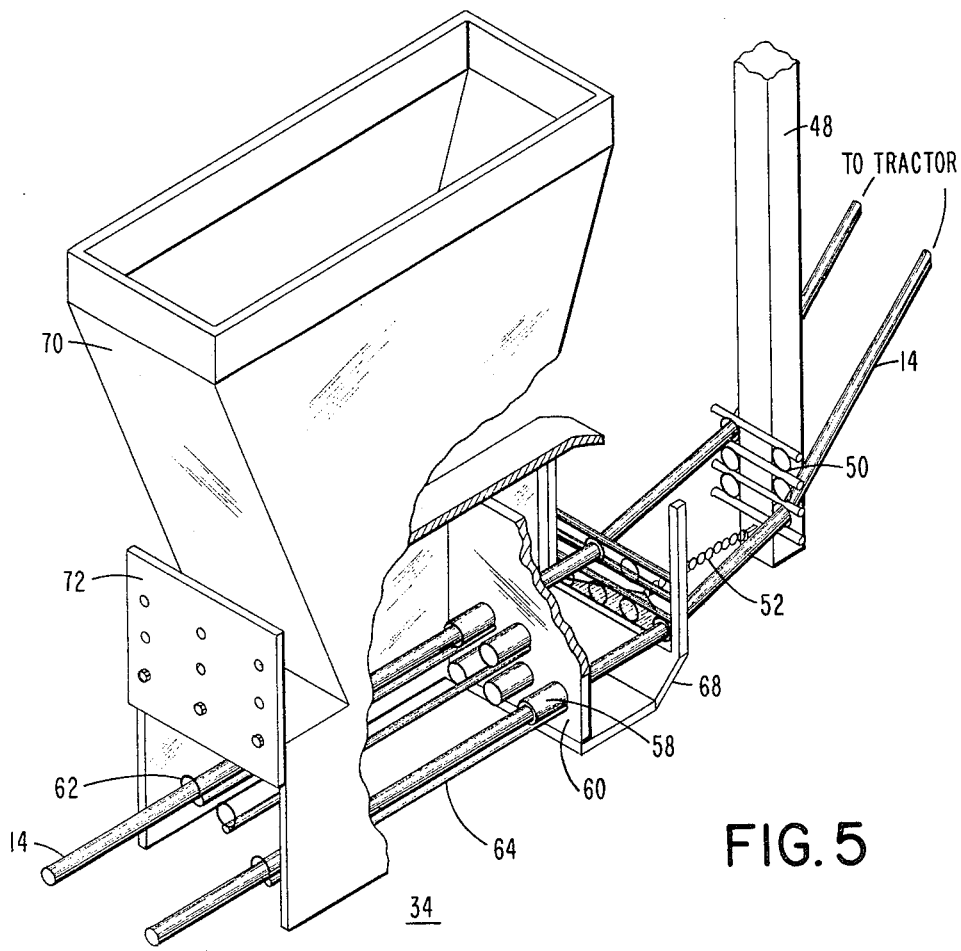
FIG. 5 is a detailed diagram of the sanding sled of FIG. 1.

Referring now to FIG. 5, there is shown a detailed diagram of the sanding sled 34 of FIG. 1. Cables 14 received from guide roller assembly 32 located at the rear of tractor 30 are routed through ferrules 50 on drag arm 48 and into a number of intermediate guide rings 58 located in a face plate 60 at the front of sled 34. A plurality of cable exit guide rings 62 are mounted on rods 64 that extend rearward from face plate 60. Sanding sled 34 includes a tapered front plate 68 to aid in levelling the bottom of the trench during operation of the cable burying apparatus. Sanding sled 34 includes a sand chute 70 that receives sand from sand supply vehicle 36 and funnels it into the area surrounding cables 14 between face plate 60 and a sand levelling plate 72 mounted at the rear of sanding sled 34. Sand levelling plate 72 is provided with a number of holes for adjusting its height and, hence, the maximum depth of sand that remains in the trench following cable emplacement operations.

Figure 6:
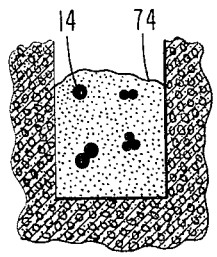
FIG. 6 is a diagram illustrating the way in which the cable burying apparatus of FIG. 1 emplaces a plurality of cables, surrounded by sand, in a previously excavated trench.

Referring now to FIG. 6, there is shown the way in which a plurality of cables 14 are surrounded by sand 74 in a trench following emplacement of the cable burying apparatus described hereinabove.

In operation, the cable supply vehicle 10 and tractor 30 are driven along the path of the trench at approximately the same speed so as to minimize slack in the cables 14. Cable supply vehicle 10 is preferably driven along one side or the other of the previously excavated trench with cable guide boom assembly 16 being swung into a position such that the rear of the cable guide boom assembly is directly over the trench. Tractor 30 is preferably driven in a position astradle the trench and, as previously mentioned, sand supply vehicle 36 is positioned with its wheels 42 astradle the trench so that sand is released directly into sand chute 70 of sanding sled 34.

We claim:

1. Apparatus for burying a plurality of cables in a previously excavated trench in a predetermined spatial relationship to each other surrounded by an initial backfill material, the apparatus comprising:

a cable supply vehicle for transporting a plurality of reels of cable for emplacement in the previously excavated trench;

cable guide means for receiving the plurality of cables from the cable supply vehicle and for guiding those cables into a cable bundle;

a sanding sled positioned within the previously excavated trench for receiving the cable bundle from the cable guide means, the sanding sled including forward guide means having a plurality of guide members for receiving the individual cables of the cable bundle in a predetermined spatial relationship to each other and rear guide means positioned adjacent the rearward portion of the sanding sled, the rear guide means having a plurality of guide members in substantial alignment with the guide members of the forward guide means and being positioned for receiving the individual cables of the cable bundle from the forward guide means and for maintaining the individual cables of the cable bundle substantially parallel to but spaced away from the side walls and bottom of the previously excavated trench and in the same spatial relationship to each other as established by the forward guide means, the sanding sled further including a sand chute conveying the initial backfill material, the sand chute being positioned between the forward and rear guide means and over the plurality of individual cables extending therebetween, the sand chute being adapted to convey the initial backfill material for flow surrounding the plurality of individual cables that extend below the sand chute in the area between the forward and rear guide means, the sanding sled further including adjustable backfill levelling means positioned adjacent the rear guide means for permitting the backfill material to be deposited into the previously excavated trench to a predetermined depth surrounding the plurality of individual cables of the cable bundle in their predetermined spatial relationship to each other; and tractor means coupled to the sanding sled for pulling the sanding sled along the trench.

2. Apparatus for burying a plurality of cables in a previously excavated trench as in claim 1 wherein the initial backfill material comprises sand, the apparatus further comprising a sand supply means for supplying sand to the sanding sled.

3. Apparatus for burying a plurality of cables in a previously excavated trench as in claim 2 wherein the sand supply means comprises a wheeled sand supply vehicle having a supply bin for controllably releasing sand to the sanding sled, the wheeled sand supply vehicle adapted to be pulled by the tractor means in concert with the sanding sled.

4. Apparatus for burying a plurality of cables in a previously excavated trench as in claim 3 wherein the wheeled sand supply vehicle includes sand shutoff means mounted within the supply bin for controlling the rate of release of sand to the sanding sled.

* * * * *